United States Patent
Reznik

(10) Patent No.: US 9,459,831 B2
(45) Date of Patent: *Oct. 4, 2016

(54) FAST COMPUTATION OF PRODUCTS BY DYADIC FRACTIONS WITH SIGN-SYMMETRIC ROUNDING ERRORS

(71) Applicant: QUALCOMM Incorporated, San Diego, CA (US)

(72) Inventor: Yuriy Reznik, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 241 days.

This patent is subject to a terminal disclaimer.

(21) Appl. No.: 14/332,028

(22) Filed: Jul. 15, 2014

(65) Prior Publication Data

US 2014/0330878 A1   Nov. 6, 2014

Related U.S. Application Data

(63) Continuation of application No. 12/139,957, filed on Jun. 16, 2008, now Pat. No. 8,819,095.

(60) Provisional application No. 60/968,381, filed on Aug. 28, 2007.

(51) Int. Cl.
   *G06F 7/483*   (2006.01)
   *G06F 7/533*   (2006.01)
   (Continued)

(52) U.S. Cl.
   CPC .............. *G06F 7/483* (2013.01); *G06F 7/533* (2013.01); *G06F 17/147* (2013.01); *H04N 19/42* (2014.11); *H04N 19/60* (2014.11); *G06F 7/49942* (2013.01)

(58) Field of Classification Search
   CPC ..... G04F 17/147; G04F 7/483; G04F 7/4836
   See application file for complete search history.

(56) References Cited

U.S. PATENT DOCUMENTS

| 5,512,898 A | 4/1996 | Norsworthy et al. |
| 6,839,386 B2 | 1/2005 | Sato et al. |

(Continued)

FOREIGN PATENT DOCUMENTS

| CN | 1550975 A | 12/2004 |
| EP | 1480119 A1 | 11/2004 |

(Continued)

OTHER PUBLICATIONS

Hinds A T: "Methodology for the design of linear algorithms for signal processing applications" PHD Thesis, Faculty of the Graduate School of the University of Colorado, Proquest UMI No. 3256406, (Online] Sep. 2007 (Sep. 2007), XP008129513, Retrieved from the Internet: URL: http://gradworks.umi.com/32/56/3256406. html.

(Continued)

*Primary Examiner* — Chuong D Ngo
(74) *Attorney, Agent, or Firm* — Elaine H. Lo

(57) ABSTRACT

A product of an integer value and an irrational value may be determined by a sign-symmetric algorithm. A process may determine possible algorithms that minimize metrics such as mean asymmetry, mean error, variance of error, and magnitude of error. Given an integer variable x and rational dyadic constants that approximate the irrational fraction, a series of intermediate values may be produced that are sign-symmetric. The intermediate values may include a sequence of addition, subtraction and right shift operations the when summed together approximate the product of the integer and irrational value. Other operations, such as additions or subtractions of 0s or shifts by 0 bits may be removed.

10 Claims, 5 Drawing Sheets

(51) Int. Cl.
*G06F 17/14* (2006.01)
*H04N 19/60* (2014.01)
*H04N 19/42* (2014.01)
*G06F 7/499* (2006.01)

(56) References Cited

U.S. PATENT DOCUMENTS

| | | | |
|---|---|---|---|
| 6,963,613 | B2 | 11/2005 | MacInnis et al. |
| 7,689,641 | B2 | 3/2010 | Abel et al. |
| 8,385,424 | B2 | 2/2013 | Reznik |
| 8,819,095 | B2 * | 8/2014 | Reznik .................. G06F 7/533 708/402 |
| 2002/0152251 | A1 | 10/2002 | Jang |
| 2003/0105787 | A1 | 6/2003 | Jang et al. |
| 2006/0294172 | A1 | 12/2006 | Zhong |
| 2007/0180010 | A1 | 8/2007 | Fallah et al. |
| 2007/0200738 | A1 | 8/2007 | Reznik et al. |
| 2007/0233764 | A1 | 10/2007 | Reznik et al. |
| 2009/0063599 | A1 | 3/2009 | Reznik |

FOREIGN PATENT DOCUMENTS

| | | | |
|---|---|---|---|
| EP | 1553523 | A2 | 7/2005 |
| EP | 1750449 | A2 | 2/2007 |
| JP | 6013914 | A | 1/1994 |
| RU | 2263947 | | 11/2005 |
| TW | 200603012 | | 1/2006 |
| TW | 200719694 | | 5/2007 |
| WO | 2007047478 | | 4/2007 |
| WO | WO-2008002897 | | 1/2008 |
| WO | 200820066 | A | 5/2008 |

OTHER PUBLICATIONS

International Search Report and Written Opinion—PCT/US2008/074607, International Search Authority—European Patent Office—Dec. 28, 2010.

Reznik et al., "Efficient fixed-point approximations of the 8×8 Inverse Discrete Cosine Transform", Applications of Digital Image Processing XXX, Sep. 24, 2007, pp. 669617-1-669617-17, vol. 6696, Proceedings of SPIE, XP002489240, ISSN: 0277-786X, DOI: 10.1117112.740228.

Rija V N., et al., "Multicriterial Optimization Approach to Eliminating Multiplications", IEEE International Workshop on Multimedia Signal Processing, 2006, 368-371,Victoria, BC, Canada, XP002489571 ISBN:0-7803-9751-7.

Taiwan Search Report—TW097132919—TIPO—Sep. 27, 2012.

* cited by examiner

FAST COMPUTATION OF PRODUCTS BY DYADIC FRACTIONS WITH SIGN-SYMMETRIC ROUNDING ERRORS

CLAIM OF PRIORITY

This application is a continuation of U.S. application Ser. No. 12/139,957, filed Jun. 16, 2008, which claims the benefit of U.S. Provisional Appl. No. 60/968,381, filed Aug. 28, 2007 and entitled "COMPUTATION OF PRODUCTS BY DYADIC FRACTIONS," the entire content of each of which is incorporated herein by reference.

BACKGROUND

1. Field

The subject matter herein relates generally to processing, and more particularly to approximation techniques used in hardware and software processing.

2. Background

Arithmetic shifts may be used to perform multiplication or division of signed integers by powers of two. Shifting left by n-bits on a signed or unsigned binary number has the effect of multiplying it by 2n. Shifting right by n-bits on a two's complement signed binary number has the effect of dividing it by 2n, but it always rounds down (i.e., towards negative infinity). Because right shifts are not linear operations, arithmetic right shifts may add rounding errors and produce results that may not be equal to the result of multiplication followed by the right shift.

In some implementations, the sign-symmetric algorithm may be used in an IDCT transform architecture or other digital filter.

One example of the use of arithmetic shifts is in fixed point implementations of some signal-processing algorithms, such as FFT, DCT, MLT, MDCT, etc. Such signal-processing algorithms typically approximate irrational (algebraic or transcendental) factors in mathematical definitions of these algorithms using dyadic rational fractions. This allows multiplications by these irrational fractions to be performed using integer additions and shifts, rather than more complex operations.

SUMMARY

A product of an integer value and an irrational value may be determined by a sign-symmetric algorithm. A process may determine possible algorithms that minimize metrics such as mean asymmetry, mean error, variance of error, and magnitude of error. Given integer variable x and rational dyadic constants that approximate the irrational fraction, a series of intermediate values may be produced that are sign-symmetric. Given a sequence of addition, subtraction and right shift operations, the sign-symmetric algorithm may approximate the product of the integer and irrational value. Other operations, such as additions or subtractions of 0s or shifts by 0 bits may be removed to simplify the processing.

This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

Figure 1:
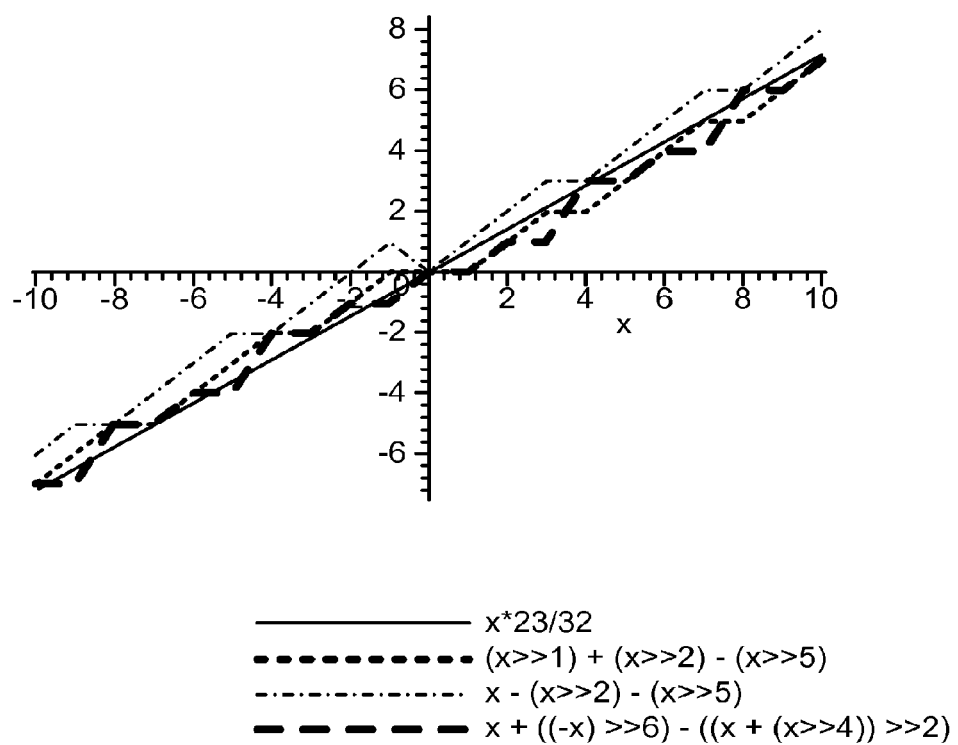
FIG. 1 is a plot of results of various computational algorithms.

Discrete Cosine Transforms (DCT) and Inverse Discrete Cosine Transforms (IDCT) perform multiplication operations with irrational constants (i.e. the cosines). In the design of implementations of the DCT/IDCT, approximations of the computing products of these irrational constants may be performed using fixed-point arithmetic. One technique for converting floating-point to fixed-point values is based on the approximations of irrational factors $\alpha_i$ by dyadic fractions:

$$\alpha_i \approx a_i/2^k \qquad (1)$$

where both $a_i$ and k are integers. Multiplication of x by factor $\alpha_i$ provides for an implementation of an approximation in integer arithmetic, as follows:

$$x\alpha_i \approx (x*a_i) >> k \qquad (2)$$

where >> denotes the bit-wise right shift operation.

The number of precision bits, k, may affect the complexity of dyadic rational approximations. In software implementations, the precision parameter k may be constrained by the width of registers (e.g., 16 or 32) and the consequence of not satisfying such a design constraint may result in extending the execution time for the transform. In hardware designs, the precision parameter k affects the number of gates needed to implement adders and multipliers. Hence, a goal in fixed point designs is to minimize the total number of bits k, while maintaining sufficient accuracy of approximations.

Without any specific constraints on values for $\alpha_i$, and assuming that for any given k, the corresponding values of nominators $a_i$ may be chosen such that:

$$|\alpha_i - a_i/2^k| = 2^{-k}|2^k\alpha_i - a_i| = 2^{-k}\min_{z \in Z}|2^k\alpha_i - z|$$

and the absolute error of approximations in (1) should be inversely proportional to $2^k$:

$$|\alpha_i - a_i/2^k| \leq 2^{-k-1}$$

That is, each extra bit of precision (i.e., incrementing k), should reduce the error by half.

In some implementations, the error rate may be improved if the values $\alpha_1$, an to be approximated can be scaled by some additional parameter $\xi$. If $\alpha_1, \ldots, \alpha_n$ are a set of n irrational numbers (n≥2), then, there exists infinitely many n+2-tuples $a_1, \ldots, a_n, k, \xi$, with $a_1, \ldots, a_n \in Z$, $k \in N$, and $\xi \in Q$, such that:

$$\max\{|\xi\alpha_1 - a_1/2^k|, \ldots, |\xi\alpha_n - a_n/2^k|\} < \frac{n}{n+1}\xi^{-1/n}2^{-k(1+1/n)}$$

In other words, if the algorithm can be altered such that all of its irrational factors $\alpha_1, \ldots, \alpha_n$ can be pre-scaled by some parameter $\xi$, then there should be approximations having absolute error that decreases as fast as $2-k(1+1/n)$. For example, when n=2, there may be approximately 50% higher effectiveness in the usage of bits. For large sets of factors $\alpha_1, \ldots, \alpha_n$, however, this gain may be smaller.

The dyadic approximations shown in relationships (1, 2) above, reduce the problem of computing products by irrational constants to multiplications by integers. Multiplication of an integer by an irrational factor $$\frac{1}{\sqrt{2}},$$

using its 5-bit dyadic approximation 23/32, illustrates the process of approximating irrational constants. By looking at the binary bit pattern of 23=10111 and substituting each "1" with an addition operation, a product of an integer multiplied by 23 may be determined as follows:

$$x*23=(x<<4)+(x<<2)+(x<<1)+x$$

This approximation requires 3 addition and 3 shift operations. By further noting that the last 3 digits form a series of "1"s, the follow may be used:

$$x*23=(x<<4)+(x<<3)-x,$$

which reduces the complexity to just 2 shift and 2 addition operations.

The sequences of operations "+" associated with isolated digits "1", or "+" and "−" associated with beginnings and ends of runs "1 . . . 1" are commonly referred to as a "Canonical Signed Digit" (CSD) decomposition. CSD is a well known implementation in the design of multiplier-less circuits. However, CSD decompositions do not always produce results with the lowest numbers of operations. For example, considering an 8-bit approximation of the same factor $1/\sqrt{2} \approx 181/256 = 10110101$ and its CSD decomposition:

$$x*181=(x<<7)+(x<<5)+(x<<4)+(x<<2)+x$$

which uses 4 addition and 4 shift operations. By rearranging the computations and reusing intermediate results, a more efficient algorithm may be constructed:

$$x2=x+(x<<2); \text{ // } 101$$

$$x3=x2+(x<<4); \text{ // } 10100$$

$$x4=x3+(x2<<5); \text{ // } 10110101=x*181$$

In accordance with an implementation, the computation of products by dyadic fractions may be derived by allowing the use of right shifts as elementary operations. For example, considering a factor $1/\sqrt{2} \approx 23/32 = 10111$, and using right shift and addition operations according to its CSD decomposition, the following is obtained:

$$x*23/32 \sim (x>>1)+(x>>2)-(x>>5). \quad (3)$$

or by further noting that $\frac{1}{2}+\frac{1}{4}=1-\frac{1}{4}$:

$$x*23/32 \sim x-(x>>2)-(x>>5). \quad (4)$$

Yet another way of computing product by the same factor is:

$$x*23/32 \sim x-((x+(x>>4))>>2)+((-x)>>6). \quad (5)$$

FIG. 1 illustrates the plots of values produced by algorithms (3, 4, and 5) versus multiplication of an integer and the irrational fraction 23/32. Each algorithm (3, 4, and 5) computes values that approximate products multiplied by the irrational fraction 23/32; however, the errors in each of these approximations are different. For example, the algorithm (4) produces all positive errors, with a maximum magnitude of 55/32. The algorithm (3) has more balanced errors, with the magnitude of oscillations within ±65/64. Finally, the algorithm (5) produces perfectly sign-symmetric errors with oscillations in ±⅞. Thus, a sign-symmetric algorithm will produce balanced results that minimize errors.

The sign-symmetry property of an algorithm $A_{\alpha_i,b}(x) \rightsquigarrow xa_i/2^b$ means that for any ($x \in Z$):

$$A_{\alpha_i,b}(-x)=-A_{\alpha_i,b}(x)$$

and it also implies that for any N, and assuming that $A_{\alpha_i,b}(0)=0$:

$$\sum_{x=-N}^{N} \left[ A_{a_i,b}(x) - x\frac{a_i}{b} \right] = 0$$

that is, a zero-mean error on any symmetric interval.

This property is may be used in the design of signal processing algorithms, as it minimizes the probability that rounding errors introduced by fixed-point approximations will accumulate. Described below is the basis for right-shift-based sign-symmetric algorithms for computing products by dyadic fractions, as well as upper bounds for their complexity.

Given a set of dyadic fractions $a_1/2^b, \ldots, a_m/2^b$, an algorithm can be defined:

$$A_{a_i, \ldots, a_m,b}(x) \rightsquigarrow (xa_1/2^b, \ldots, xa_m/2^b)$$

as the following sequence of steps:

$$x_1, x_2, \ldots, x_t,$$

where $x_1:=x$, and where subsequent values $x_k$ (k=2, . . . , t) are produced by using one of the following elementary operations:

$$x_k := \begin{cases} x_i \gg s_k; & 1 \leq i < k, s_k \geq 1; \\ -x_i; & 1 \leq i < k; \\ x_i + x_j; & 1 \leq i, j < k; \\ x_i - x_j; & 1 \leq i, j < k, i \neq j \end{cases}.$$

The algorithm terminates when there exists indices $j_1, \ldots, j_m \leq t$, such that:

$$x_{j_1} \sim x*a_1/2^b, \ldots, x_{j_m} \sim x*a_m/2^b$$

Thus, some implementations examine algorithms that minimize one or more of the following metrics:

mean asymmetry:

$$\chi_{A_{a_i,b}} = \frac{1}{2^b} \sum_{x=1}^{2^b} |A_{a_i,b}(x) + A_{a_i,b}(-x)|$$

mean error:

$$\mu_{A_{a_i,b}} = \frac{1}{2^{b+1}} \sum_{x=-2^b}^{2^b} \left[ A_{a_i,b}(x) - x\frac{a_i}{2^b} \right]$$

variance of error:

$$\sigma^2_{A_{a_i,b}} = \frac{1}{2^{b+1}-1} \sum_{x=-2^b}^{2^b} \left[ A_{a_i,b}(x) - \mu_{A_{a_i,b}} \right]^2$$

magnitude of error:

$$\delta^{max}_{A_{a_i,b}} = \max_{x=-2^b \ldots 2^b} \left| A_{a_i,b}(x) - \mu_{A_{a_i,b}} \right|$$

When computing products by multiple constants $$\frac{a_1}{2^b}, \ldots, \frac{a_m}{2^b},$$

the worst case values of the above metrics (computed for each of the constants $$\frac{a_1}{2^b}, \ldots, \frac{a_m}{2^b})$$

may be used to evaluate efficiency of the algorithm.

Figure 2:
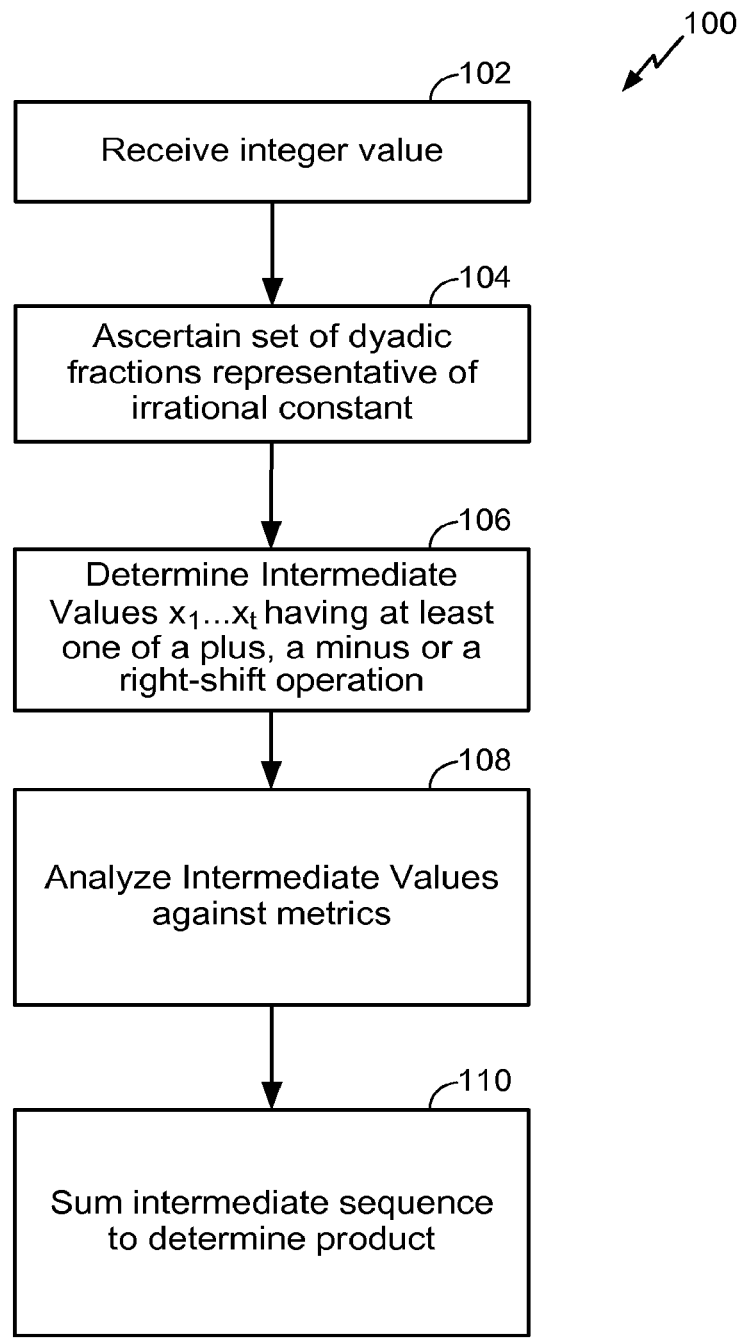
FIG. 2 is a flow diagram of an example process of determining a sign-symmetric algorithm to determine a product.

FIG. 2 shows stages in a process 100 for computing a product. At 102, an integer value is received and, at 104, rational dyadic constants representative of irrational value to be multiplied by the integer are ascertained. At 106, intermediate values may be determined. For example, given the integer variable x and a set of rational dyadic constants $$\frac{a_1}{2^b}, \ldots, \frac{a_m}{2^b},$$

a series of intermediate values may be determined as follows:

$$w_0, w_1, w_2, \ldots, w_t$$

where: $w_0=0$, $w_1=x$, and for all $k \geq 2$ values $w_k$ are obtained as follows:

$$w_k = \pm w_i \pm (w_j >> s_k) \quad (i,j<k),$$

where ± signs imply either plus or minus operation that needs to be performed with both terms, and >> denotes the right shift of variable $z_j$ by $s_k$ bits.

At 108, the points in this series corresponding to products are determined That is, the result of this step are indices $l_1, \ldots, l_m \leq t$, such that:

$$w_{l_1} \approx x\frac{a_1}{2^b}, \ldots, w_{l_m} \approx x\frac{a_m}{2^b}$$

At 110, the resulting output values $$w_{l_1} \approx x\frac{a_1}{2^b}, \ldots, w_{l_m} \approx x\frac{a_m}{2^b}$$

are analyzed against certain precision metrics. For example, these values can be analyzed to determine if they minimize one of mean, asymmetry, variance, magnitude.

In some implementations, the process 100 may remove additions or subtractions of 0s, or shifts by 0 bits. In some implementations, the sequence of intermediate values may be chosen such that the total computational (or implementation) cost of this entire operation is minimal.

Thus, given a set of metrics, there may be algorithms having a complexity that can be characterized by a total number of additions, a total number of shifts, etc. As such, there is an algorithm that has a least number of additions, a least number of shifts, a least number of additions and shifts, and a least number of additions among algorithms attaining the least number of additions and shifts, etc.

Figure 3:
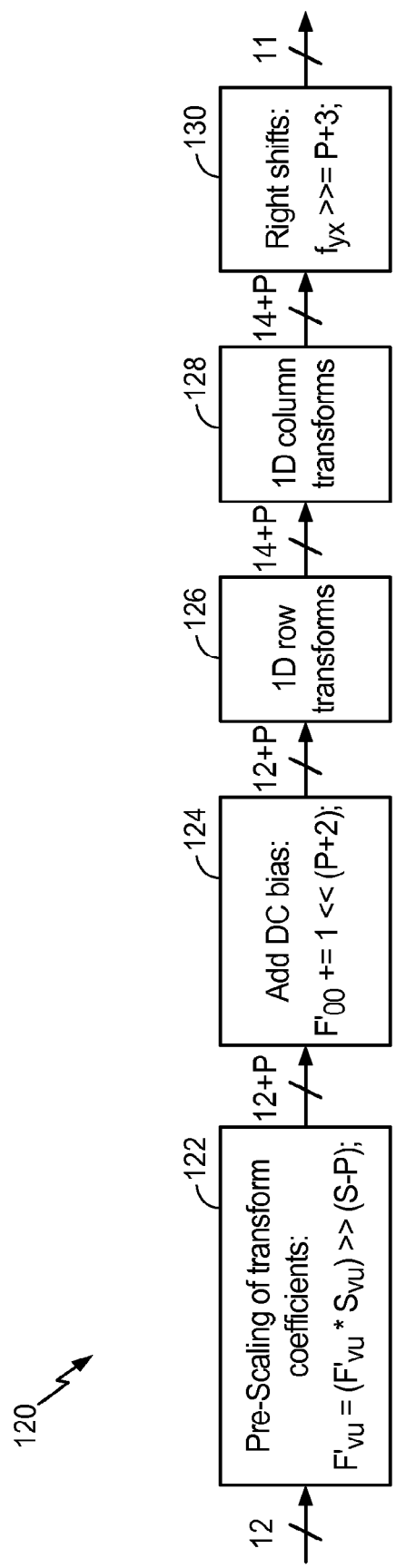
FIG. 3 is an exemplary architecture implementing a fixed-point IDCT algorithm.

FIG. 3 illustrates an exemplary fixed-point 8×8 IDCT architecture 120. the architecture may implement algorithms that are sign-symmetric values of x. In many implementations, such algorithms may be the least complex for a given set of factors. As noted above, the design of the IDCTs may be symmetric or result in well-balanced rounding errors. In some implementations, estimates of metrics such as mean, variance, and magnitude (maximum values) of errors produced by the algorithms may be analyzed. In assessing the complexity of the algorithms, the numbers of operations, as well as the longest execution path, and maximum number of intermediate registers needed for computations may be taken into account.

In some implementations, the architecture used in the design of the proposed fixed-point IDCT architecture 120 may be characterized having separable and scaled features. A scaling stage 122 may include a single 8×8 matrix that is precomputed by factoring the 1D scale factors for the row transform with the 1D scale factors for the column transform. The scaling stage 122 may also be used to pre-allocate P bits of precision to each of the input DCT coefficients thereby providing a fixed-point "mantissa" for use throughout the rest of the transform.

In an implementation, the basis for scaled 1D transform design may be a variant of the well-known factorization of C. Loeffler, A. Ligtenberg, and G. S. Moschytz with 3 planar rotations and 2 independent factors $\gamma=\sqrt{2}$. To provide for efficient rational approximations of constants α, β, δ, ε, η, and θ within the LLM factorization, two floating factors ξ and ζ, may be used and applied to two sub-groups of these constants as follows:

$$\xi: \alpha'=\xi\alpha, \beta'=\xi\beta;$$

$$\zeta: \delta'=\zeta\delta, \epsilon'=\zeta\epsilon, \eta'=\zeta\eta, \theta'=\zeta\theta;$$

These multiplications may be inverted by ξ and ζ in the scaling stage 122 by multiplying each input DCT coefficient with the respective reciprocal of ξ and ζ. That is, a vector of scale factors may be computed for use in the scaling stage 122 prior to the first in the cascade of 1D transforms (e.g., stages 126 and 128):

$$\sigma=(1, 1/\zeta, 1/\xi, \gamma/\zeta, 1, \gamma/\zeta, 1/\xi, 1/\zeta)^T$$

These factors may be subsequently merged into a scaling matrix which is precomputed as follows:

$$\Sigma = \sigma\sigma^T 2^S = \begin{pmatrix} A & B & C & D & A & D & C & B \\ B & E & F & G & B & G & F & E \\ C & F & H & I & C & I & H & F \\ D & G & I & J & D & J & I & G \\ A & B & C & D & A & D & C & B \\ D & G & I & J & D & J & I & G \\ C & F & H & I & C & I & H & F \\ B & E & F & G & B & G & F & E \end{pmatrix}$$

where A-J denote unique values in this product:

$$A = 2^S, B = \frac{2^S}{\zeta}, C = \frac{2^S}{\xi}, D = \frac{\gamma 2^S}{\zeta}, E = \frac{2^S}{\zeta^2},$$

$$F = \frac{2^S}{\xi\zeta}, G = \frac{\gamma 2^S}{\zeta^2}, H = \frac{2^S}{\xi^2}, I = \frac{\gamma 2^S}{\xi\zeta}, J = \frac{\gamma^2 2^S}{\zeta^2},$$

and S denotes the number of fixed-point precision bits allocated for scaling.

This parameter S may be chosen such that it is greater than or equal to the number of bits P for the mantissa of each input coefficient. This allows scaling of the coefficients $F_{vu}$, to be implemented as follows:

$$F'_{vu} = (F_{vu} * S_{vu}) >> (S-P)$$

where $S_{vu} \approx \Sigma vu$ denote integer approximations of values in matrix of scale factors.

At the end of the last transform stage in the series of 1D transforms (stages 126 and 128), the P fixed-point mantissa bits (plus 3 extra bits accumulated during executions of each of the 1D stages‡) are simply shifted out of the transform outputs by right shift operations 130, as follows:

$$f_{yx} = f'_{yx} >> (P+3)$$

To ensure a proper rounding of the computed value, a bias of 2P+2 may be added to the values $f'_{yx}$ prior to the shifts using a DC bias stage 124. This rounding bias is implemented by perturbing the DC coefficient prior to executing the first 1D transform:

$$F''_{00} = F'_{00} + 2^{P+2}$$

In some implementations, balanced (i.e., sign-symmetric) algorithms as discussed above may be used in the ISO/IEC 23002-2 IDCT standard. This standard defines process for computation of products by the following constants:

$$y \sim y * 113/128,$$

$$z \sim y * 719/4096$$

and is accomplished as follows:

$$x2 = (x>>3) - (x>>7);$$

$$x3 = x2 - (x>>11);$$

$$y = x2 + (x3>>1);$$

$$z = x - x2;$$

Figure 4:
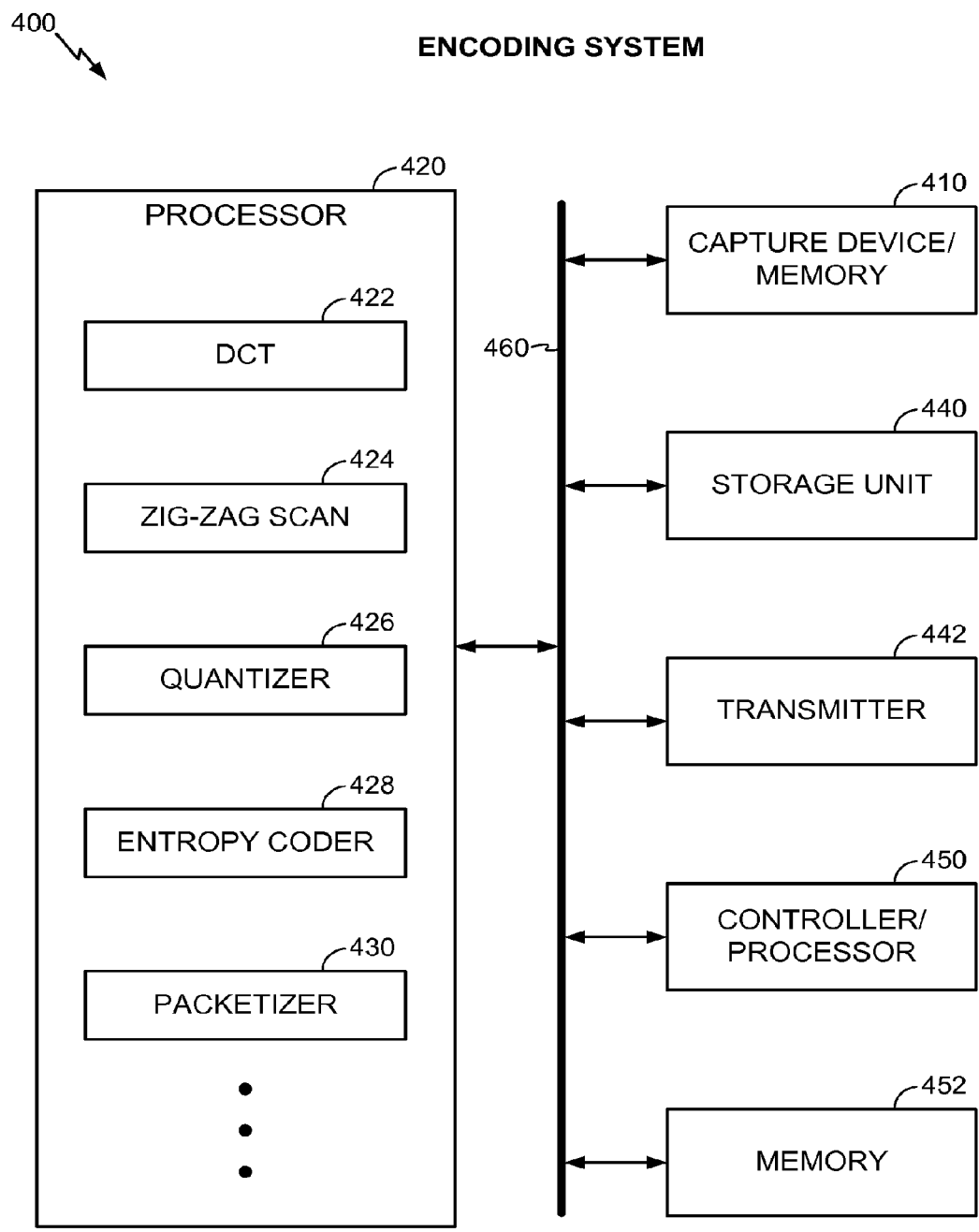
FIG. 4 is a block diagram of an exemplary encoding system.

FIG. 4 shows a block diagram of an encoding system 400, which may include transforms implementing the dyadic fractions having sign-symmetric rounding errors, as described above. A capture device/memory 410 may receive a source signal, perform conversion to digital format, and provides input/raw data. Capture device 410 may be a video camera, a digitizer, or some other device. A processor 420 processes the raw data and generates compressed data. Within processor 420, the raw data may be transformed by a DCT unit 422, scanned by a zig-zag scan unit 424, quantized by a quantizer 426, encoded by an entropy encoder 428, and packetized by a packetizer 430. DCT unit 422 may perform 2D DCTs on the raw data in accordance with the techniques described herein and may support both full and scaled interfaces. Each of units 422 through 430 may be implemented a hardware, firmware and/or software. For example, DCT unit 422 may be implemented with dedicated hardware, a set of instructions for an arithmetic logic unit (ALU), etc.

A storage unit 440 may store the compressed data from processor 420. A transmitter 442 may transmit the compressed data. A controller/processor 450 controls the operation of various units in encoding system 400. A memory 452 stores data and program codes for encoding system 400. One or more buses 460 interconnect various units in encoding system 400.

Figure 5:
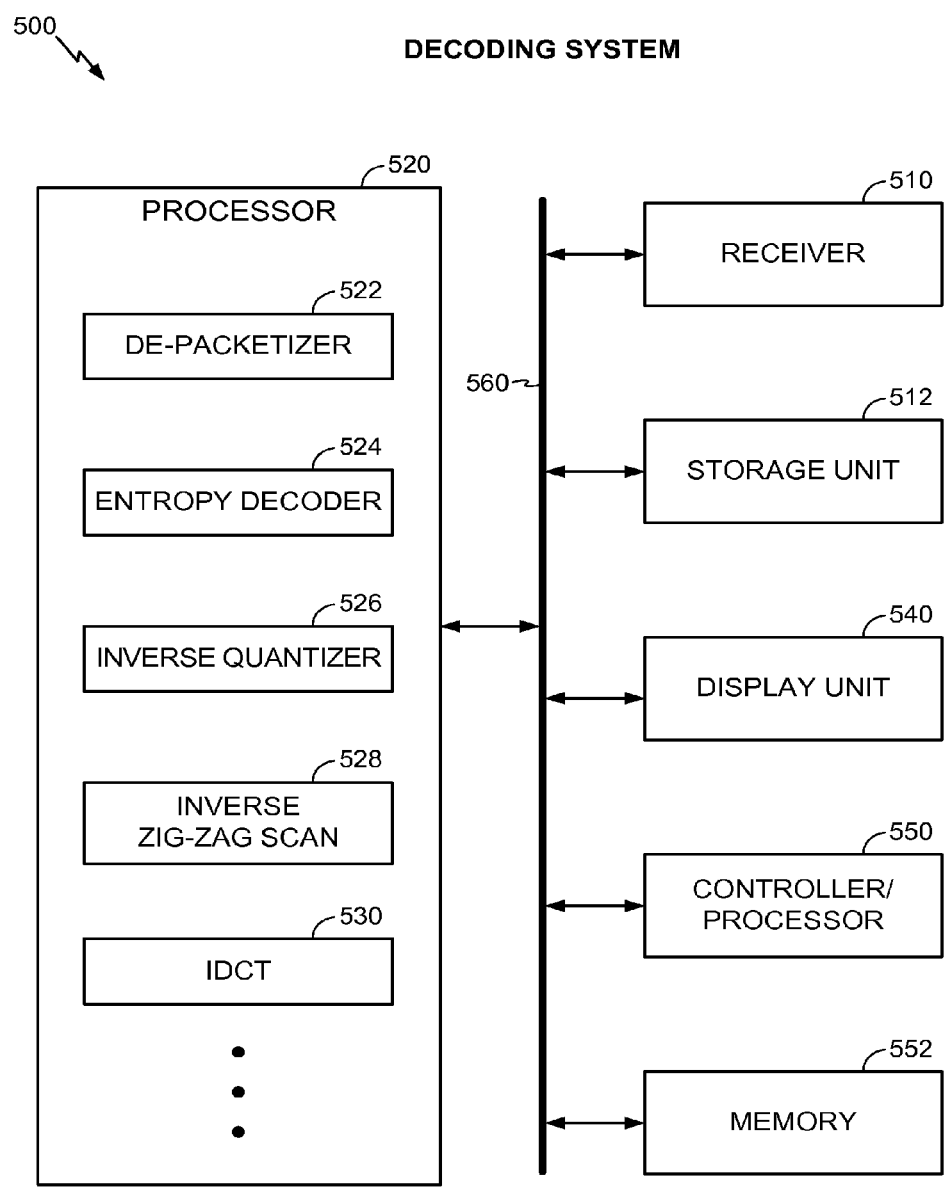
FIG. 5 is a block diagram of an exemplary decoding system.

FIG. 5 shows a block diagram of a decoding system 500, which may include transforms implementing the dyadic fractions having sign-symmetric rounding errors, as described above. A receiver 510 may receive compressed data from an encoding system, and a storage unit 512 may store the received compressed data. A processor 520 processes the compressed data and generates output data. Within processor 520, the compressed data may be de-packetized by a de-packetizer 522, decoded by an entropy decoder 524, inverse quantized by an inverse quantizer 526, placed in the proper order by an inverse zig-zag scan unit 528, and transformed by an IDCT unit 530. IDCT unit 530 may perform 2D IDCTs on the full or scaled transform coefficients in accordance with the techniques described herein and may support both full and scaled interfaces. Each of units 522 through 530 may be implemented a hardware, firmware and/or software. For example, IDCT unit 530 may be implemented with dedicated hardware, a set of instructions for an ALU, etc.

A display unit 540 displays reconstructed images and video from processor 520. A controller/processor 550 controls the operation of various units in decoding system 500. A memory 552 stores data and program codes for decoding system 500. One or more buses 560 interconnect various units in decoding system 500.

Processors 420 and 520 may each be implemented with one or more application specific integrated circuits (ASICs), digital signal processors (DSPs), and/or some other type of processors. Alternatively, processors 420 and 520 may each be replaced with one or more random access memories (RAMs), read only memory (ROMs), electrical programmable ROMs (EPROMs), electrically erasable programmable ROMs (EEPROMs), magnetic disks, optical disks, and/or other types of volatile and nonvolatile memories known in the art.

The embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

The stages of a method or algorithm described in connection with the embodiments disclosed herein may be embodied directly in hardware, in a software module executed by a processor, or in a combination of the two. A software module may reside in random access memory ("RAM"), flash memory, read-only memory ("ROM"), erasable programmable read-only memory ("EPROM"), electrically-erasable programmable read-only memory ("EEPROM"), registers, a hard disk, a removable disk, a CD-ROM, or any other form of storage medium known in the art. An example storage medium is coupled to the processor, such that the processor can read information from, and write information to, the storage medium. In the alternative, the storage medium may be integral to the processor. The processor and the storage medium may reside in an application-specific user circuit ("ASIC"). The ASIC may reside in a user terminal. In the alternative, the processor and the storage medium may reside as discrete components in a user terminal.

It should be noted that the methods described herein may be implemented on a variety of hardware, processors and systems known by one of ordinary skill in the art. For example, a machine that is used in an implementation may have a display to display content and information, a processor to control the operation of the client and a memory for storing data and programs related to the operation of the machine. In some implementations, the machine is a cellular phone. In some implementations, the machine is a handheld computer or handset having communications capabilities. In another implementation, the machine is a personal computer having communications capabilities.

The various illustrative logics, logical blocks, modules, and circuits described in connection with the implementations disclosed herein may be implemented or performed with a general purpose processor, a DSP, an ASIC, a field programmable gate array (FPGA) or other programmable logic device, discrete gate or transistor logic, discrete hardware components, or any combination thereof designed to perform functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
one or more processors coupled to a memory, the one or more processors configured to determine an algorithm for calculating two or more products of an integer value x and approximations of two or more irrational values by:
receiving the integer value x;
determining a set of dyadic fractions $a_1/2^b \ldots a_m/2^b$ approximating the two or more irrational values;
determining a sequence of intermediate values $w_1 \ldots w_t$ to calculate the two or more products by:
setting $w_1$ equal to the integer value x; and
determining $w_2 \ldots w_t$ in accordance with (a) at least one of $w_1 \ldots w_{t-1}$, and (b) one of a plus operation, a minus operation, and a right-shift operation;
determining indices $l_1 \ldots l_m \leq t$ of intermediate values among the sequence of intermediate values $w_1 \ldots w_t$ that correspond to the two or more products, such that:

$w_{l1} \approx x^*a_1/2^b \ldots w_{lm} \approx x^*a_m/2^b$; and determining the sequence of intermediate values $w_1 \ldots w_t$ and determining the indices $l_1 \ldots l_m \leq t$ of the intermediate values among the sequence of intermediate values $w_1 \ldots w_t$ to minimize an error metric.

2. The apparatus of claim 1, wherein the error metric comprises one or more of a mean asymmetry metric, a mean error metric, a variance of error metric, and a magnitude of error metric.

3. The apparatus of claim 2, wherein the one or more processors are further configured to evaluate a processing efficiency of the algorithm based on a worst case result of the intermediate values among the sequence of intermediate values $w_1 \ldots w_t$ in accordance with the one or more of the mean asymmetry metric, the mean error metric, the variance of error metric, and the magnitude of error metric.

4. The apparatus of claim 1, wherein determining the sequence of intermediate values $w_1 \ldots w_t$ comprises determining the sequence of intermediate values $w_1 \ldots w_t$ having a least number of additions.

5. The apparatus of claim 1, wherein determining the sequence of intermediate values $w_1 \ldots w_t$ comprises determining the sequence of intermediate values $w_1 \ldots w_t$ having a least number of right shifts.

6. The apparatus of claim 1, wherein determining the sequence of intermediate values $w_1 \ldots w_t$ comprises determining the sequence of intermediate values $w_1 \ldots w_t$ having the least number of additions and right shifts.

7. The apparatus of claim 6, wherein the one or more processors are further configured to determine the algorithm by determining intermediate values among the sequence of intermediate values $w_1 \ldots w_t$ having the least number of additions and right shifts having a least number of additions.

8. The apparatus of claim 1, wherein determining $w_2 \ldots w_t$ comprises defining a member $w_k$ of the sequence of intermediate values $w_1 \ldots w_t$ as having one of the values $w_i \gg s_k$, $-w_i$, $w_i+w_j$, or $w_i-w_j$, where $s_k$ is a number of bits to right shift $w_i$, i is less than k, and j is less than k.

9. The apparatus of claim 1, wherein determining the sequence of intermediate values $w_1 \ldots w_t$ and determining the indices $l_1 \ldots l_m \leq t$ of the intermediate values among the sequence of intermediate values $w_1 \ldots w_t$ comprises determining the intermediate values among the sequence of intermediate values $w_1 \ldots w_t$ as a sign-symmetric sequence minimizing a mean asymmetry metric.

10. An apparatus comprising:
one or more processors coupled to a memory, the one or more processors configured to determine an algorithm for calculating two or more products of an integer value x and approximations of two or more irrational values by:
receiving the integer value x;
determining a set of dyadic fractions $a_1/2^b \ldots a_m/2^b$ approximating the two or more irrational values;
determining a sequence of intermediate values $w_1 \ldots w_t$ to calculate the two or more products;
determining indices $l_1 \ldots l_m \leq t$ of intermediate values among the sequence of intermediate values $w_1 \ldots w_t$ that correspond to the two or more products, such that:

$$w_{l_1} \approx x*a_1/2^b \ldots w_{l_m} \approx x*a_m/2^b; \text{ and}$$

determining the sequence of intermediate values $w_1 \ldots w_t$ and determining the indices $l_1 \ldots l_m \leq t$ of the intermediate values among the sequence of intermediate values $w_1 \ldots w_t$ by:
setting $w_1$ equal to the integer value x; and
determining $w_2 \ldots w_t$ in accordance with one of $w_1 \ldots w_{t-1}$ and one of a plus operation, a minus operation, and a right-shift operation,
wherein determining the intermediate values among the sequence of intermediate values $w_1 \ldots w_t$ comprises determining the intermediate values among the sequence of intermediate values $w_1 \ldots w_t$ in accordance with one or more of a mean asymmetry metric, a mean error metric, a variance of error metric, and a magnitude of error metric.

* * * * *